US009847024B2

(12) United States Patent
Witte et al.

(10) Patent No.: US 9,847,024 B2
(45) Date of Patent: Dec. 19, 2017

(54) METHODS AND SYSTEMS FOR PROVIDING A TRAFFIC CONGESTION WARNING

(71) Applicant: TomTom Traffic B.V., Amsterdam (NL)

(72) Inventors: Nikolaus Witte, Berlin (DE); Stefan Lorkowski, Berlin (DE)

(73) Assignee: TOMTOM TRAFFIC B.V., Amsterdam (NL)

( * ) Notice: Subject to any disclaimer, the term of this patent is extended or adjusted under 35 U.S.C. 154(b) by 0 days.

(21) Appl. No.: 15/120,160

(22) PCT Filed: Feb. 20, 2015

(86) PCT No.: PCT/EP2015/053655
§ 371 (c)(1),
(2) Date: Aug. 19, 2016

(87) PCT Pub. No.: WO2015/124747
PCT Pub. Date: Aug. 27, 2015

(65) Prior Publication Data

US 2017/0061793 A1 Mar. 2, 2017

(30) Foreign Application Priority Data

Feb. 21, 2014 (GB) .................................. 1403114.0

(51) Int. Cl.
*G08G 1/0967* (2006.01)
*G08G 1/01* (2006.01)
(Continued)

(52) U.S. Cl.
CPC ....... *G08G 1/096725* (2013.01); *G08G 1/012* (2013.01); *G08G 1/0129* (2013.01);
(Continued)

(58) Field of Classification Search
CPC ............ G08G 1/01; G08G 1/16; G01C 21/34
(Continued)

(56) References Cited

U.S. PATENT DOCUMENTS 6,185,503 B1 2/2001 Sumizawa
7,376,509 B2 * 5/2008 Endo ................. G01C 21/3492
340/902
(Continued)

FOREIGN PATENT DOCUMENTS

CN 102610087 A 7/2012
DE 102010021665 A1 1/2011
(Continued)

OTHER PUBLICATIONS

International Search Report of International Application No. PCT/EP2015/053655 dated May 8, 2015.
(Continued)

*Primary Examiner* — Tan Q Nguyen

(57) ABSTRACT

A method is provided of providing jam warning messages in relation to jams affecting navigable segments of a network of navigable segments. The method comprises, for each of one or more identified jams, obtaining a jam tail flow speed for the jam. The jam tail flow speed is preferably determined from the analysis of positional data relating to the current or relatively recent movement of a plurality of devices associated with vehicles along at least some navigable segments of a navigable network with respect to time. The jam tail flow speed is used to generate, or to determine whether to generate, a jam warning message in respect of the jam.

17 Claims, 6 Drawing Sheets

(51) Int. Cl.
*G08G 1/16* (2006.01)
*G01C 21/34* (2006.01)

(52) U.S. Cl.
CPC ..... *G08G 1/0133* (2013.01); *G08G 1/096716* (2013.01); *G08G 1/096775* (2013.01); *G08G 1/166* (2013.01)

(58) Field of Classification Search
USPC .......................................................... 701/533
See application file for complete search history.

(56) References Cited

U.S. PATENT DOCUMENTS

| | | | | |
|---|---|---|---|---|
| 2007/0005231 | A1 | 1/2007 | Seguchi | |
| 2008/0270015 | A1* | 10/2008 | Ishikawa | G01S 5/0027 701/119 |
| 2015/0032289 | A1 | 1/2015 | Lotz et al. | |
| 2016/0247397 | A1* | 8/2016 | Xu | G08G 1/0125 |

FOREIGN PATENT DOCUMENTS

| | | | |
|---|---|---|---|
| DE | 102010051244 | A1 | 6/2011 |
| DE | 102013007865 | A1 | 12/2013 |
| EP | 0810570 | A1 | 12/1997 |
| JP | 2003288693 | A | 10/2003 |
| WO | 2013135535 | A1 | 9/2013 |

OTHER PUBLICATIONS

Sarch Report of United Kingdom Application No. GB 1403114.0 dated Jul. 4, 2014.

* cited by examiner

METHODS AND SYSTEMS FOR PROVIDING A TRAFFIC CONGESTION WARNING

CROSS-REFERENCES TO RELATED APPLICATIONS

This application is the National Stage of International Application No. PCT/EP2015/053655, filed Feb. 20, 2015, and designating the United States, which claims benefit to United Kingdom Patent Application No. 1403114.0 filed Feb. 21, 2014. The entire content of these applications is incorporated herein by reference.

FIELD OF THE INVENTION

The present invention relates to methods and systems for generating traffic congestion or "jam" warning messages in relation to traffic jams affecting navigable segments of a network of navigable segments.

BACKGROUND TO THE INVENTION

Road users increasingly rely upon traffic flow information to inform them of any incidents which may affect travel time on a journey, and to help plan travel. Such information may be provided to a user during navigation along a route via an in-car navigation device, such as a personal navigation device (PND) or integrated device, or may be provided as an input to an Advanced Driver Assistance System (ADAS). Traffic information may also be used for route planning, e.g. by a navigation device or ADAS, before commencing a journey, or to recalculate a fastest route during a journey if conditions change en route. The information has conventionally been based on messages sent over an FM radio network via the Traffic Message Channel (TMC), which may be received by navigation devices and conveyed to a user, or otherwise used by an ADAS or navigation system. A typical TMC message would include information identifying a geographic location, type and direction of an incident according to certain standard codes. More recently other traffic information systems have been developed, which are based upon so-called "probe" data obtained from mobile phones, PNDs and other devices having positioning capability located in vehicles, which can be used to identify locations and speeds of vehicles, and thus indicate traffic conditions.

The Applicant has realised that the above systems have improved the accuracy with which traffic information can be provided to users of navigation devices. However, the focus of such systems has tended to be upon route planning, e.g. allowing an optimal route to be generated taking into account traffic conditions, and/or to generate an alternative route if a planned route is affected by traffic. One aspect that has received less attention is that of using traffic information to improve safety in a road network. The presence of traffic jams affecting road segments can be a significant factor in causing accidents in the road network. The tail end of a traffic jam affecting a road segment may move at a speed substantially slower than the speed of travel along the segment that might usually be expected under non-jam collisions. Accidents may occur when vehicles approach the tail of a traffic jam at inappropriate speeds, resulting in rear-end collisions. This may occur when vehicles have inadequate warning of an upcoming traffic jam, or at least its severity, and are unable to slow down sufficiently to avoid collision when approaching the tail end of the jam.

DE 102010051244 discloses methods for generating warnings in relation to jams when a vehicle is at a predetermined distance or time from the jam tail, taking into account a position of the jam tail and speed of progression of the jam.

The Applicant has realised that there remains a need for improved methods and systems for warning drivers of traffic congestion or traffic jams affecting navigable segments in a navigable network.

SUMMARY OF THE INVENTION

In accordance with a first aspect of the invention there is provided a method of providing jam warning messages in relation to jams affecting navigable segments of a network of navigable segments, the method comprising, for each of one or more identified jams, obtaining a jam tail flow speed for the jam, and using the jam tail flow speed in generating and/or determining whether to generate a jam warning message in respect of the jam.

Thus, in accordance with the invention, a flow speed of a jam tail is taken into account when generating and/or determining whether to generate a jam warning message in respect of a given jam affecting a navigable segment of the network of navigable segments. This is in contrast to prior art techniques which typically base jam warning message generation upon an average jam flow speed taking into account an entire length of the jam. It has been recognised that the speed of travel in the tail portion of a jam may differ significantly from the average flow speed considered over the entire length of the jam. Thus, by using the jam tail flow speed in determining whether to generate a jam warning message, it is possible to provide more relevant jam warnings. e.g. where they are actually required to reduce risk of rear end collision. Alternatively or additionally, consideration of the jam tail flow speed enables more accurate and reliable jam warning messages to be generated. For example, this may result in more accurate timing of providing the message to a vehicle to ensure that appropriate action may be taken in time to avert danger. The content of the message, e.g. relating to severity of the jam may also be more reliable and accurate.

These advantages stem from the fact that the jam tail flow speed is indicative of a severity of the jam in the region that will first be encountered by a vehicle. For example, a tail flow speed of a jam may be significantly lower than the average flow speed for the entire jam. If the average speed of travel for the jam as a whole were considered in generating the jam warning message as in prior art techniques, it might be determined that no warning for an approaching vehicle was necessary, as this average flow speed might not fall below a speed threshold used in jam warning message generation. This could result in a risk of rear end collision when non-warned vehicles encountered the more slowly moving jam. Alternatively, if a warning were issued, this might not adequately reflect the severity of the jam in the region that would be first encountered, or might be provided to a vehicle too late resulting in a greater likelihood that a vehicle might not adjust speed sufficiently before encountering the jam.

The present invention extends to a system for performing a method in accordance with the invention in any of its aspects or embodiments.

According to a further aspect of the invention there is provided a system for providing jam warning messages in relation to jams affecting navigable segments of a network of navigable segments, the system comprising means for obtaining, for each of one or more identified jams, a jam tail flow speed for the jam, and using the jam tail flow speed in generating and/or determining whether to generate a jam warning message in respect of the jam.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The present invention is a computer implemented invention. The means for carrying out any of the steps of the method may comprise a set of one or more processors configured, e.g. programmed, for doing so. A given step may be carried out using the same or a different set of processors to any other step. Any given step may be carried out using a combination of sets of processors.

In some embodiments, the method of the present invention in any of its aspects or embodiments is carried out using a navigation device, and the present invention extends to a navigation device arranged to carry out the steps of the method of any of the aspects or embodiments of the invention. The navigation device is preferably a mobile device. The navigation device may be a portable navigation device (PND) or an integrated, e.g. in-vehicle, device. In accordance with any of the aspects or embodiments of the invention the navigation device may comprise a display for displaying an electronic map to a user, a set of one or more processors configured to access digital map data and cause an electronic map to be displayed to a user via the display, and a user interface operable by a user to enable the user to interact with the device. Thus, the system of the present invention may be a processing device of a mobile device, such as a navigation device.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a processing device of a server.

Of course, the steps of the method of the present invention in any of its aspects or embodiments may be carried out in part by a server and in part by a navigation device (or other mobile device). The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Thus, the system of the present invention may be provided in part by a navigation device or other mobile device, and in part by a server.

In preferred embodiments the method comprises the step of comparing the obtained jam tail flow speed to a current speed of travel, or to a historical speed of travel along an applicable navigable segment. The results of the comparison are used in generating and/or determining whether to generate a warning message in respect of the jam. The current speed of travel is a current speed of travel of a vehicle approaching the jam. The method may comprise generating a jam warning message when a current speed of travel or historical speed of travel along the applicable navigable segment exceeds the jam tail flow speed by more than a predetermined amount. In this way a jam warning message may be generated in respect of jams of a severity such that travel speeds along the affected segment are reduced, at least at the jam tail, by a significant amount, as assessed by comparison of a current speed or historical speed of travel along an applicable segment to the jam tail flow speed. In addition, or alternatively to using the current speed of travel or historical speed of travel along an applicable navigable segment to determine whether to generate a jam warning message in this manner, a comparison of a current or historical speed of travel to the jam tail flow speed may be used in generating a message. The results of the comparison may be used in determining a timing for delivery and/or content of the jam warning message. For example, the extent by which the current speed of travel or historical speed of travel along an applicable navigable segment exceeds the jam tail flow speed may be used to determine how soon the message needs to be provided, or a severity of the warning provided.

The applicable navigable segment used in embodiments considering historical speeds of travel is a navigable segment upstream of the tail end front of the jam. The method may extend to the step of determining the tail end front of the jam. The navigable segment may be the same navigable segment affected by the jam, or a navigable segment upstream of that segment. The segment is selected such that the historical speed of travel along the segment provides a reasonable reflection of the speeds of travel that would normally be expected in the region of the navigable network where the tail end of the jam is located in the absence of the jam. The step of comparing the jam tail flow speed to a historical speed of travel along an applicable segment involves comparing the jam tail flow speed to the applicable historical speed of travel, e.g. average speed of travel along the segment. The applicable historic speed of travel is that speed of travel relevant to the current time.

The predetermined amount in any of the embodiments involving comparison of a current speed or historical speed to the jam tail flow speed may be in the form of a threshold. A jam warning message may be generated when a difference between the current or historic speed of travel and the jam tail flow speed is greater than or equal than the predetermined amount. The method may comprise, where the current or historical speed of travel does not exceed the jam tail flow speed by more than the predetermined amount, not generating a jam warning.

The predetermined amount may be set as desired. The predetermined amount may be a preset value, that may be used in all cases, or may be variable depending upon the particular situation. For example, the predetermined amount may depend upon the properties, such as the geometry, of the segment that is currently being travelled, or to which the historical speed data relates. The applicable predetermined amount for the given segment may then be used as appropriate. For example, a smaller value for the predetermined amount might be associated with segments with high levels of curvature or other properties that might impede a drivers ability to modify the speed of their vehicle in time when encountering the tail end of a jam. In some embodiments data indicative of the predetermined amount may be associated with data indicative of a segment, e.g. digital map data. The amount may be set to provide a balance between issuing unnecessary warnings, i.e. where expected or actual speeds of travel of a vehicle upstream of the jam tail does not significantly exceed the jam tail flow speed, such that there may be minimal risk of a rear end collision when the vehicle encounters the jam, and providing enhanced safety, by generating a message that may be used to prompt action to be taken to modify the vehicle speed before encountering the jam tail so as to mitigate a real risk of rear end collision. Alternatively or additionally, the predetermined amount may be selected depending upon current conditions on the segment, e.g. as received from a real-time information source or as determined from one or more sensors of the vehicle. For example, the predetermined amount may be smaller where there are adverse conditions that might impede the ability of drivers to see and react to the tail end of the jam in a prompt fashion. Thus, a smaller predetermined amount may be used where weather conditions adversely affect visibility. In some embodiments each segment may be associated with data indicative of a plurality of different predetermined amounts for use in the comparison, and which are applicable to different conditions.

In some embodiments the method comprises the step of, where the historical speed of travel along an applicable navigable segment exceeds the jam tail flow speed by more than a predetermined amount, generating a jam warning. It may be assumed that vehicles travel with a speed that corresponds to, or is at least similar to, the historical speed of travel along the segment. Thus, the historic speed of travel along the segment may be used as a measure of the likely speeds of travel of vehicles currently traversing the segment. This step may ensure that a jam warning is generated if the expected speed of travel of vehicles along the segment exceeds the jam tail flow speed by more than the predetermined amount. However, this is achieved without needing to have knowledge of actual speeds travelled by individual vehicles. Those embodiments in which the jam tail flow speed is compared to a historical speed of travel for an applicable segment in generating, or determining whether to generate a jam warning message may therefore advantageously be implemented by a server. A server may be arranged to perform the steps of comparing the jam tail flow speed to a historical speed of travel along the applicable navigable segment, and, where the historical speed of travel along the navigable segment exceeds the jam tail flow speed by more than a predetermined amount, generating a jam warning message.

Those embodiments of the invention in which the jam tail flow speed is compared to a current speed of travel to determine whether to generate, or to generate a jam warning message, are preferably implemented by a navigation device or other processing device positionable or integrated in a vehicle. The method may therefore comprise a device obtaining a jam tail flow speed for a jam, and using the jam tail flow speed in generating and/or determining whether to generate a jam warning message in any of the manners described above. The current speed of travel may be a current speed of travel of a vehicle with which the device is associated. The current position of the device will then correspond to the current speed of the vehicle. The navigation device is therefore preferably associated with a vehicle. The method may extend to the step of the navigation device determining a current speed of travel, i.e. of the device. The steps of the method may be triggered when a current position reaches a predetermined distance behind of an identified jam, or a given distance dependent upon a current speed, etc.

The steps of the present invention are carried out for one or more identified jam affecting a navigable segment of the network. The present invention may extend to the step of identifying the or each jam. Such steps are preferably carried out by a server. In embodiments in which a navigation device carries out the steps of using the jam tail flow speed to generate or determine whether to generate jam warning messages, the navigation device preferably obtains data indicative of the or each identified jam from a server. The navigation device may receive jam data in respect of jams within a given area based upon a current location of the device or a planned route. For example, such data may be received via a traffic feed. Of course, a navigation or other processing device might, in other embodiments, identify the or each jam itself.

It will be appreciated that the methods of the present invention may or may not be applied to every identified jam. Thus, the at least one identified jam to which the methods are applied to determine whether to output a jam warning need not be every jam that is identified in the system, but will be at least some of the jams. A navigation device may carry out the steps of the method in relation to an identified jam that is being approached. In contrast, a server may carry out the steps of the method in relation to a plurality of identified jams in order to generate jam warning messages in respect of jams in a more extensive area of the navigable network for provision to multiple devices associated with vehicles, e.g. via a traffic feed.

In embodiments the method comprises identifying the one or more jam in the navigable network based upon live positional data relating to the movement of a plurality of devices with respect to time along navigable segments of the network. The method may comprise analysing the positional data to identify the occurrence of the at least one jam affecting a navigable segment. The positional step is typically "live" positional data, i.e. being indicative of current, or at least relatively recent (e.g. the last 5-10 minutes), conditions along the navigable segments. Such a step is preferably carried out by a server. In accordance with the invention in any of its aspects or embodiments, (live) positional data relating to the movement of a plurality of devices with respect to time along the segment may be obtained in relation to at least some of the navigable segments of the network.

The step of analysing the (live) positional data to identify the existence of at least one jam affecting a navigable segment may be carried out in any suitable manner. The step is preferably carried out by a server, which may be the same server that then carries out the method of generating jam warning message of the invention. The step may be carried out by determining whether one or more jam conditions associated with segments of the at least some navigable segments of the navigable network in respect of which live positional data is obtained are satisfied. This may be carried out using the live positional data relating to travel of devices along the segment(s). Thus, in some embodiments the or each navigable segment that is affected by a jam is a segment along which one or more jam condition is satisfied. In preferred embodiments the step of identifying the existence of the or each jam affecting a segment is carried out using a live or current speed of travel, e.g. average speed of travel, along segments of the at least some of the navigable segments of the network.

It will be appreciated that a jam may affect at least a portion of one or more navigable segments. Thus, the step of identifying the occurrence of a jam may involve identifying the occurrence of a jam affecting at least a portion of one or more navigable segments. This may be achieved by identifying at least a portion of one or more segments that may be considered jammed. The method may comprise determining that the segment is jammed when an average speed of travel along the entire segment, or at least a portion thereof is less than a predetermined speed for the segment. It may be simpler to consider the live speed of travel along the segment as a whole. The actual position of a jam identified along the segment may then be determined using a more detailed consideration of the live speed of travel of vehicles along the segment with respect to distance along the segment. The predetermined speed or other jam condition for a segment may be set appropriately such that a jam will be identified if at least a portion of the segment is in a jammed state as desired.

In accordance with the invention in any of its embodiments, the method comprises the step of obtaining a jam tail flow speed for the or each identified jam. The step of obtaining the jam tail flow speed may comprise determining such a speed in any of the manners later described. In other embodiments, the step of obtaining the jam tail flow speed may comprise receiving data indicative of the jam tail flow speed. The data may be received from a server. In embodiments in which a navigation or other processing device carries out the steps of obtaining and using the jam tail flow speed, preferably the step of obtaining the jam tail flow speed comprises receiving data indicative thereof, e.g. from a server. The jam tail flow speed data may be received together with data identifying the jam, e.g. as part of a live traffic feed. In preferred embodiments in which the method comprises a step of determining the jam tail speed, such a step is preferably carried out by a server. The server may then make data indicative of the jam tail flow speed available to a navigation device for use in generating and/or determining whether to generate a jam warning message.

In accordance with the invention in any of its aspects or embodiments, the jam tail refers to a tail end portion of the jam. The tail end of the jam will be the end first encountered when approaching the jam along a navigable segment in the direction of travel of the segment. The jam tail flow speed is the flow speed in respect of only the tail end portion of the jam. The jam tail flow speed does not take into account speeds of travel along portions of the jam other than the tail portion. This is in contrast to an average flow speed for the jam as a whole, upon which previously proposed jam warning systems have typically been based. The jam tail portion of the jam may be defined in any suitable manner. The jam tail portion may be defined in absolute terms or relative terms, e.g. relative to the length of the jam. In some embodiments the jam tail may be a predetermined distance along the jam from the tail end jam front, e.g. 150 m. In other embodiments the jam tail portion may be defined as a proportion of the length of the jam, e.g. the last 10% of the jam. In yet other embodiments the jam tail portion may be determined dynamically by consideration of speeds of travel of vehicles in the jam, e.g. being a portion of the jam extending from the tail end jam front for a distance corresponding to a portion of the jam where vehicle speeds are substantially lower than an average jam speed taking into account vehicle speeds for the jam as a whole.

In preferred embodiments the tail end portion of a jam may be determined using positional data indicative of the movement of devices, e.g. associated with vehicles with respect to time along the navigable segment(s) affected by the jam. Preferably the positional data is live positional data. The live positional data may be of any of the forms described above for use in identifying jams. The method may extend to the step of obtaining the live positional data in any of the manners previously described.

A jam tail flow speed may be determined in any suitable manner using the live positional data relating to movement of devices associated with vehicles with respect to time along the affected segment. It will be appreciated that the position of the tail end front may be inferred by reference to the live speeds of travel of a plurality of vehicles at different positions along the segment. It will be appreciated that the live positional data relating to the travel of devices associated with vehicles along the segment affected by a jam may be used to determine a live speed of travel, e.g. an average live speed of travel, of devices with respect to position, and preferably additionally time, along a navigable segment that is affected by a jam. This may provide detailed information regarding the position of the jam tail front, and its progression over time.

Additional data relating to an identified jam may be determined, preferably using at least live positional data for the segment affected. The data is preferably determined by a server. The data may be provided to a navigation device by a server, e.g. together with the jam tail flow speed data. The method may comprise a navigation device receiving any such data. A location for the jam is preferably determined. The location may be a location of any reference point along the jam, but preferably is a jam tail front location. Data indicative of the progression of the jam tail front may be determined. Such data will indicate in which direction the tail front is moving, i.e. upstream or downstream in the direction of travel for the affected segment, and optionally a speed at which the tail front is moving. Data indicative of the reliability of the jam data may be determined. Such data may be in the form of a measure indicative of the reliability of the jam data, i.e. a quality factor.

In embodiments in which historical speed of travel data for a navigable segment is used, a position of the jam tail front of the jam is preferably determined, and the historical speed of travel data relates to a navigable segment upstream of the tail front of the jam.

The following features of live positional data, and methods of obtaining such data, are applicable to any steps of the invention that may use live positional data, whether to identify a jam and/or to determine a tail end flow speed for an identified jam.

Live data may be thought of as data which is relatively current and provides an indication of what is occurring on the segment. The live data may typically relate to the conditions on the segment within the last 30 minutes. In some embodiments the live data may relate to conditions on the segment within the last 15 minutes, 10 minutes or 5 minutes.

The step of obtaining the live positional data may or may not comprise receiving the live positional data from the devices. In some arrangements the step of obtaining the data may comprise accessing the data, i.e. retrieving data that had previously been received and stored, such as by a server that is to use the date or otherwise, or receiving the data from any other suitable source or sources. For example, where the live positional data is obtained by a server, the data may be received from devices at another server, e.g. a traffic server, and then obtained by the server from the another server for use in accordance with the methods of the present invention. In arrangements in which the method involves receiving the data from the devices, it is envisaged that the method may further comprise storing the received positional data before proceeding to filtering the data and carrying out the other steps of the present invention. The step of obtaining the positional data need not take place at the same time or place as the other step or steps of the method.

In embodiments the live positional data is in the form of a plurality of positional or probe traces, each representing the position of a device at different times. The live positional data relates to the movement of the devices associated with vehicles with respect to time, and may be used to provide a positional "trace" of the path taken by the device. As mentioned above, the data may be received from the devices or may first be stored. The devices may be any mobile devices that are capable of providing the positional data and sufficient associated timing data for the purposes of the present invention. The device may be any device having position determining capability. Typically the device may comprise a GPS or GSM device. Such devices may include navigation devices, mobile telecommunications devices with positioning capability, position sensors, etc. As the device is associated with a vehicle, the position of the device will correspond to the position of the vehicle. The device may be integrated with the vehicle, e.g. an in-built sensor or navigation apparatus, or may be a separate device associated with the vehicle such as a portable navigation apparatus. Of course, the positional data may be obtained from a combination of different devices, or a single type of device. The vehicle(s) may be of any suitable type e.g. automobiles, vans, lorries, etc.

It will be appreciated that the positional data obtained from the plurality of devices, may be referred to as "probe data", or more specifically "vehicle probe data". References to probe data herein should therefore be understood as being interchangeable with the term "positional data", and the positional data may be referred to as probe data for brevity herein.

In this method a plurality of time-stamped position data is preferably captured/uploaded from a plurality of devices associated with vehicles having positioning capability e.g. navigation devices, such as portable navigations devices (PNDs). Techniques of analysing such data, e.g. to obtain average speed data are known, for example as described in WO 2009/053411 A1; the entire contents of which is enclosed herein by reference.

In addition to the live positional data obtained from devices associated with vehicles, other sources of live data may additionally be used. For example live data from any one of the following sources may additionally be used in determining the presence of a jam and/or a jam tail flow speed or other parameters relating to any identified jam: cellular telephone networks; road loop generated data; and traffic cameras (including ANPR—Automatic Number Plate Recognition).

It will be seen that in accordance with certain preferred embodiments, the present invention may be implemented by a server based upon (live) positional data relating to the movement of devices with respect to time in the navigable network. Preferably the server is arranged to carry out a method comprising the steps of:

obtaining positional data relating to the current or recent movement of a plurality of devices associated with vehicles along at least some navigable segments of a navigable network with respect to time;

analysing the positional data to identify the occurrence of at least one jam affecting a navigable segment;

determining a jam tail flow speed for the or each identified jam;

comparing the jam tail flow speed to a historical speed of travel along an applicable navigable segment; and, where the historical speed of travel along the navigable segment exceeds the jam tail flow speed by more than a predetermined amount, generating a jam warning message.

The invention extends to a server arranged to perform such steps. Thus, according to a further aspect of the invention there is provided a further aspect of the invention there is provided a server comprising:

means for obtaining positional data relating to the current or recent movement of a plurality of devices associated with vehicles along at least some navigable segments of a navigable network with respect to time;

means for analysing the live positional data to identify the occurrence of at least one jam affecting a navigable segment;

means for determining a jam tail flow speed for the or each identified jam;

means for comparing the jam tail flow speed to a historical speed of travel along an applicable navigable segment; and means for, where the historical speed of travel along the navigable segment exceeds the jam tail flow speed by more than a predetermined amount, generating a jam warning message.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors.

In accordance with certain of its aspects or embodiments, the invention comprises comparing the jam tail flow speed to a historical speed of travel along an applicable navigable segment. In this context the words "historic" or "historical" should be considered to indicate data that is not live, that is data that is not directly reflective of conditions on the segment at the present time or in the recent past (perhaps within roughly the last five, ten, fifteen or thirty minutes). Historic average speeds and historic travel times may for example relate to events occurring days, weeks or even years in the past. A historic average speed may be recorded directly, or may be calculated from a recorded historic travel time across the segment. Historical positional data can also be referred to as aggregated positional data, since it will typically comprise positional data from a plurality of different mobile devices collected over an extended period of time, such as a number of weeks or months. Historical positional data is therefore useful in analysing the repeating patterns in the behaviour of vehicles on portions of the network over long time periods (such as the average speed of travel along a road at various different times of the day); live positional data meanwhile, as mentioned above, is useful in detecting more transient behaviour of vehicles (such as identifying the occurrence of a traffic jam, or similar event affecting traffic flow, on a navigable segment).

Preferably the historical speed of travel along the navigable segment is an average historical speed of travel. A segment may have a plurality of historic average speeds of travel associated therewith, e.g. with each average speed being representative of the average speed along the segment during a particular time period. In such embodiments, the applicable historical average speed to which the jam tail flow speed is compared is preferably the historical average speed for the relevant segment at the appropriate time, e.g. applicable to a current time, i.e. day of week, time of day, etc.

The method may extend to the step of obtaining historical speed data, e.g. average speed data for a navigable segment. The method may or may not extend to the step of determining the historic speed data associated with a navigable segment. The step of obtaining the historic speed data may simply involve accessing the applicable data. In some embodiments historic speed data, and preferably historic average speed data, is stored in association with the or each navigable segment. For example, the data may be stored associated with digital map data indicative of the segment.

In a preferred embodiment, the historic speed data for traversing a navigable segment is obtained using positional data relating to the movement of a plurality of devices with respect to time along the navigable segment. In other words, vehicle probe data is used. The positional or probe data may be of any of the types described above in relation to the live positional data that is used, but instead being historical data. An average speed associated with a segment can be determined according to the method described in the aforementioned WO 2009/053411 A1. In this method a plurality of time-stamped position data is preferably captured/uploaded from a plurality of navigation devices, such as portable navigations devices (PNDs). This data is preferably divided into a plurality of traces, with each trace representing data received from a navigation device over a predetermined time period. An average may then be taken of the recorded speeds within each predetermined time period for each navigable segment. The method may or may not extend to the step of receiving the historical positional data and obtaining the historical speed of travel data, e.g. average speed of travel data based thereon for a segment or segments.

In embodiments in which a jam warning message is generated, various actions may be performed in relation to the generated message. The method may comprise storing data indicative of a generated jam warning message in association with data indicative of the jam to which it relates, e.g. a location of the jam. This step may be performed by a server, such that a generated jam warning message may subsequently be issued.

Where the jam warning message is generated by a server, the method may extend to the step of issuing the jam warning message. The step of issuing a warning message involves making the warning message available, e.g. to one or more devices, which may be client devices, and/or to another server (which may or may not be a client server). Issuing of a warning message may involve issuing the warning message itself or any data indicative thereof. Issuing a warning message may involve transmitting data indicative of the warning message to the or each device or server. The data may be transmitted directly or via one or more intermediate components, such as another server. A server may automatically cause the data indicative of the warning message to be transmitted to a device or server, or may cause the data to be transmitted in response to a request received from a device or server. Thus, making the warning message available may involve transmitting data indicative of the message or making the warning message available for subsequent transmission e.g. to a device or server. For example, the server may inform a device or server that the message is available e.g. at a specific location, such that the device or server may then subsequently retrieve the message from that location.

The warning message may be issued to one or more devices, e.g. client devices. The or each device is preferably associated with a vehicle. The or each device may be a navigation device and/or an automatic vehicle management system, e.g. ADAS system associated with a vehicle. Alternatively or additionally, the step of issuing the warning message may comprise the server issuing the warning message to another server, e.g. via a communication network. The server may transmit data indicative of the warning message to the another server. The another server may then use the obtained data indicative of a message or not, depending upon its settings. The another server may in turn issue the warning message to one or more client devices associated with vehicles and in communication therewith. In these embodiments the another server may be arranged to receive a plurality of warning messages, e.g. from one or more server, and may select a subset of the messages for issue to its client devices. The another server may be a server associated with an automobile manufacturer, navigation system provider, etc.

In any of the embodiments of the invention in which a server generates the jam warning message, the server may broadcast the generated jam warning message. The message may be issued, i.e. output in any suitable manner to enable it to be used by any one of a plurality of servers and/or devices associated with vehicles, e.g. navigation devices and/or automatic vehicle control systems. This is in contrast to transmitting the warning to, for example, a specific navigation device associated with a vehicle.

The server may issue the or each jam warning message together with data relating to the jam to which the warning relates. The data indicative of the jam may be indicative of one or more of: the jam location; the jam tail front location; a speed of progression of the jam; and the jam tail flow speed. The server may additionally or alternatively provide data indicative of the difference between the jam tail flow speed and a historical average speed for the segment. This may be indicative of a severity of the jam.

In accordance with these preferred embodiments, it will be appreciated that jam warnings are generated centrally by a server, enabling them to be rapidly and efficiently disseminated to devices associated with vehicles via an existing communications infrastructure. The jam warnings may be incorporated in a live traffic feed provided by the server. The server may issue the or each jam warning message as part of a bulk feed of traffic data. The jam warning message data may be provided together with other live traffic data for the network e.g. indicative of jams in the network. It will be appreciated that a jam warning message may not be provided for every jam. In some embodiments the method may comprise the server issuing a first set of data indicative of one or more jam in the network, wherein the server additionally provides a jam warning message in respect of the or each jam, and a second set of data indicative of one or more jam in the network, wherein the server does not provide a jam warning message in association with the or each jam.

The server may be arranged to periodically issue generated jam warnings. For example, the warnings may be issued at intervals of, for example, every 2 minutes, together with other traffic information that is issued. This may correspond to the frequency with which the server outputs bulk feed traffic information.

The server may issue all generated jam warnings, e.g. since a previous issue, or a subset thereof. In some embodiments in which the server issues jam warnings by transmitting the warnings to devices, e.g. navigation devices or automatic vehicle control systems associated with vehicles, the server may issue the jam warnings in respect of jams having locations within a given area based on the position of the or each vehicle. In other words, only relevant jam warnings may be transmitted to devices.

When a jam warning message is received, e.g. by a device associated with a vehicle or a server, the jam warning may or may not be used by the device or server. This may depend upon the settings of the receiving device or server. The server may be a third party server. A jam warning may only be output when a vehicle travels along an affected segment, or is travelling along a route that incorporates the affected segment.

Whether generated by a server, navigation device or otherwise, a generated jam warning message may be used in any suitable manner. Any of the steps described relating to the use of a message may be carried out by the same device or server that generated the message, or another server or device that has received the generated message. Preferably the generated jam warning message is used by a device associated with a vehicle. For example, a device associated with a vehicle may use an issued message received from a server or which it has itself generated.

A jam warning message may be output to a driver, and the method extends to such a step. The warning may be output in any suitable manner, including visually, audibly and/or haptically. The warning may be output by a navigation device. For example, a jam icon may be shown in a displayed view of the path ahead of the vehicle, or a more active warning may be given to draw attention to the jam. In some embodiments the navigation device is a navigation device that generated the jam message warning. In other embodiments the jam warning message may be a warning that was generated externally to a navigation device and received by the navigation device for output to a driver. For example, the jam warning message may be generated by a server and issued to the navigation device for output. The jam warning message may be output to prompt a driver to reduce their speed. However, in other cases, the message may simply be used to draw attention to the jam, so that a driver is alerted to the upcoming problem, or can maintain an already appropriate speed.

Alternatively or additionally, the generated message may be issued to an automatic vehicle control system associated with a vehicle for use by the system in controlling vehicle behaviour. The message may be issued thereto by a server, or a navigation device associated with the vehicle. The vehicle control system may use the message to trigger certain vehicle behaviour, such as to select an appropriate speed for the vehicle, to apply the brakes to slow the vehicle, etc. The vehicle control system may be an ADAS (Advanced Driver Assistance System). The method extends to the step of an automatic vehicle control system using a received generated message in any of these manners. The method may comprise an automatic vehicle control system intervening to reduce the speed of a vehicle based on a received jam warning message.

Thus a generated message may be communicated, directly or indirectly, to a driver e.g. via a navigation or other processing device associated with their vehicle, or to a vehicle management system, such as an ADAS (Advanced Driver Assistance System) associated with vehicle, to enable the driver and/or ADAS system to take appropriate action, such as to slow the vehicle, before the jam tail is encountered. In this way, drivers and/or ADAS systems may be provided with advance warning of jams that are having a significant impact on speeds of travel along affected segments, and where there would be a risk of rear-end collisions if vehicles were to travel at usual speeds along the segment. A warning that is output by a navigation device associated with a vehicle, or an intervention by a vehicle control system based on a received jam warning message may be triggered in any suitable manner. For example, the warning message may be output, or acted upon when the vehicle reaches a predetermined distance before the jam tail. The predetermined distance may be a specified distance, or may be based upon a current speed of travel of the vehicle.

The jam warning message may be used in other manners. For example, a generated jam warning message may be used to generate a speed recommendation to a driver. This may be carried out by a navigation or other similar processing device.

In accordance with the invention in any of its aspects or embodiments, the navigable segments are navigable segments of a navigable network in a geographic area. The geographic area is covered by a digital map. While, embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment.

It will be appreciated that the methods described above, in any of their embodiments, relating to a jam and/or jam warning message, may be implemented in relation to each identified jam and/or generated jam warning message. In some preferred embodiments, particularly where the method is implemented by a server, a plurality of jam warning messages are generated, and preferably issued.

In embodiments in which data indicative of a location of a jam, e.g. a jam tail, is provided or received, the location data may be any suitable data which references the location in a manner which enables the location data to be used to identify the location on a digital map. The location is by reference to a real world position of the jam or jam tail along a navigable segment. The location data may be determined using a digital map. For example, a digital map may be used to encode the location data. The digital map need not be the same digital map upon which it is ultimately required to identify the location. The location data may be decoded using another digital map in a manner which enables the same location that was encoded to be identified.

It will be appreciated that in the paragraphs above and below the phrase "average speed" is used. It will be appreciated however that in reality it may never be possible to know an average speed completely accurately. In some cases for example, average speeds calculated can only be as accurate as the equipment used to measure time and position. It will be appreciated therefore that wherever the phrase "average speed" is used, it should be interpreted as the average speed as calculated based on measurements which may themselves have associated errors.

Any reference to comparing one item to another may involve comparing either item with the other item, and in any manner.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

Any of the methods in accordance with the present invention may be implemented at least partially using software, e.g. computer programs. The present invention thus also extends to a computer program comprising computer readable instructions executable to perform a method according to any of the aspects of embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

It will be appreciated that references to a "warning message" refer to a "jam warning message" herein, unless the context demands otherwise.

It will also be appreciated that the term "traffic jam" can be used interchangeably with the term "traffic congestion" in the preceding or following passages; both terms indicating a condition where vehicles are prevented from travelling at a free flow speed along segments of a navigable network due to the volume of traffic exceeding the capacity for the segment.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which.

DETAILED DESCRIPTION OF THE PREFERRED EMBODIMENTS

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
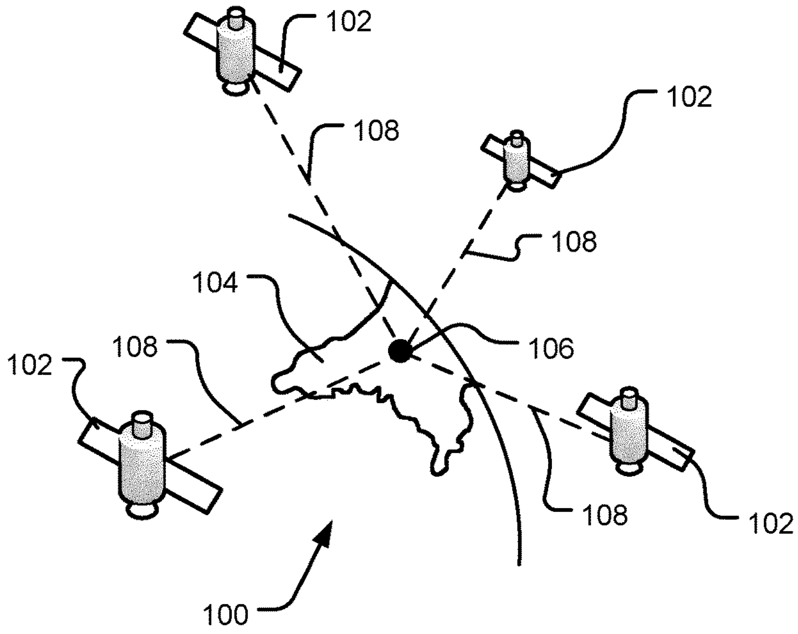
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
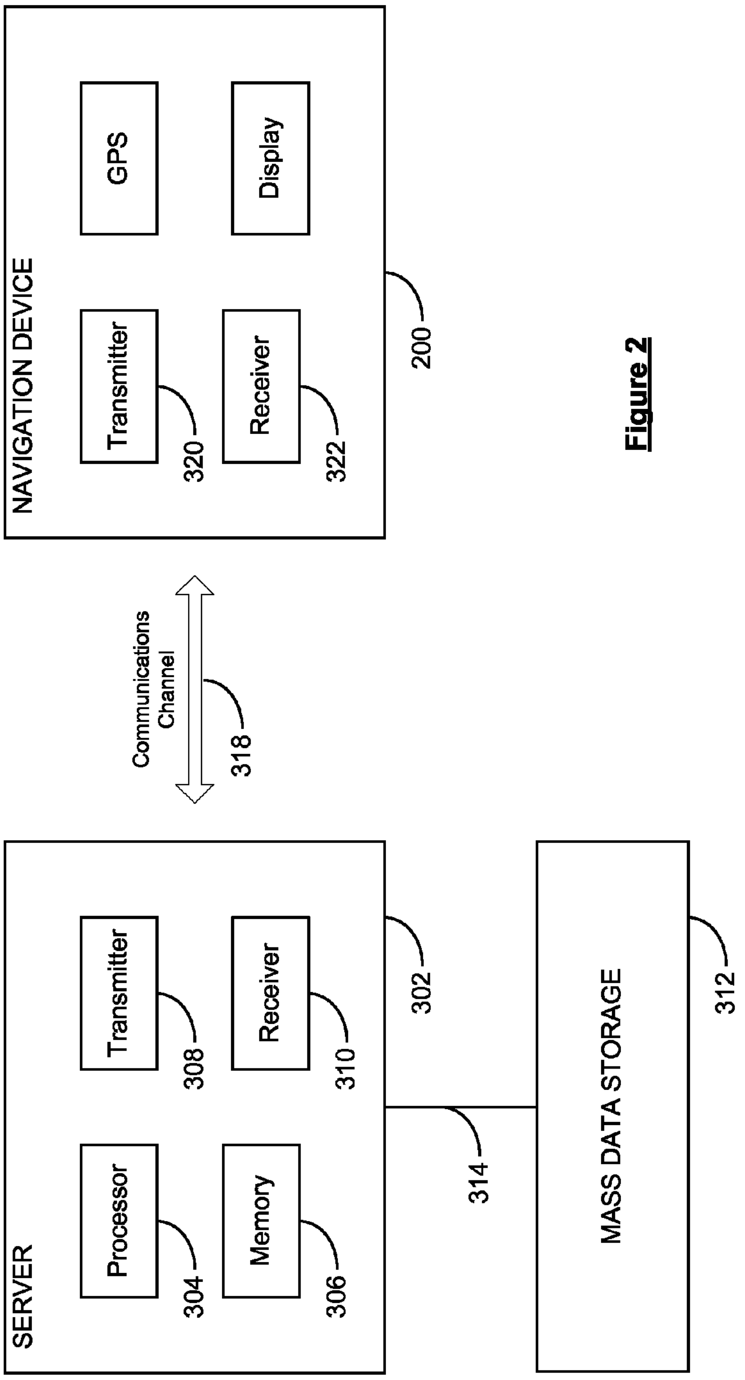
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
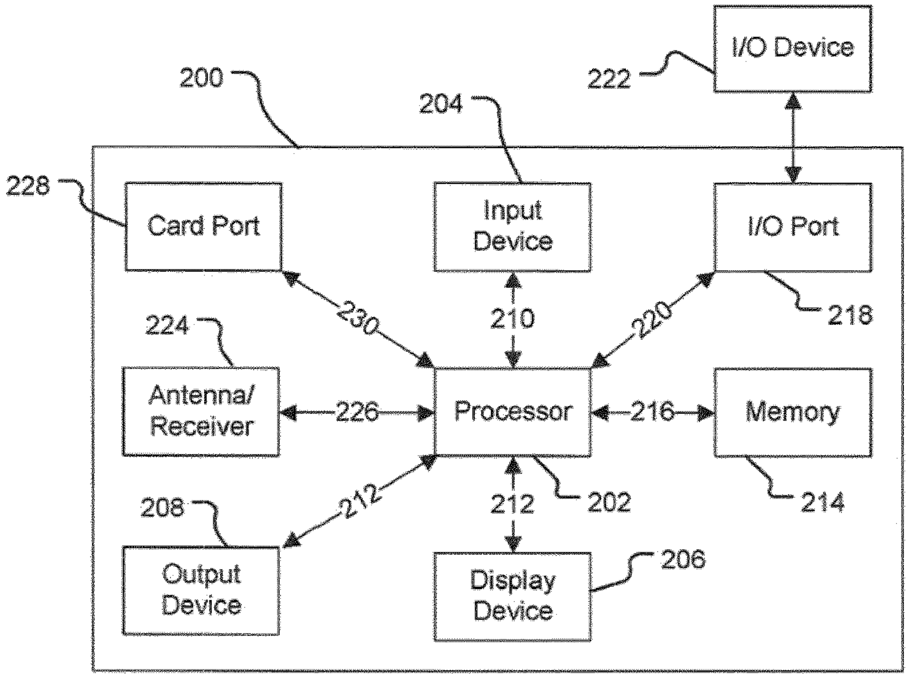
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or hand-held navigation use. Indeed, in other embodiments, the device 200 may be arranged to be handheld to allow for navigation of a user.

Figure 4:
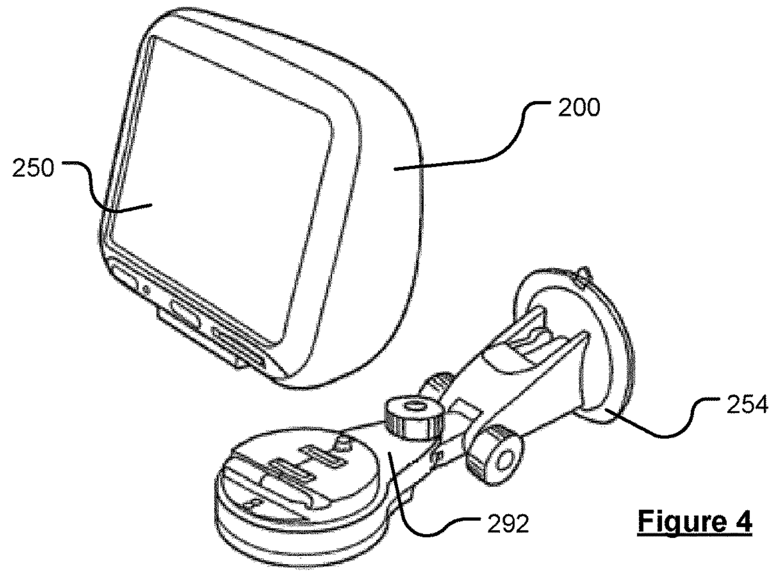
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to deleted the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

Some preferred embodiments of the invention will now be described by reference to FIGS. 5 to 8.

Figure 5:
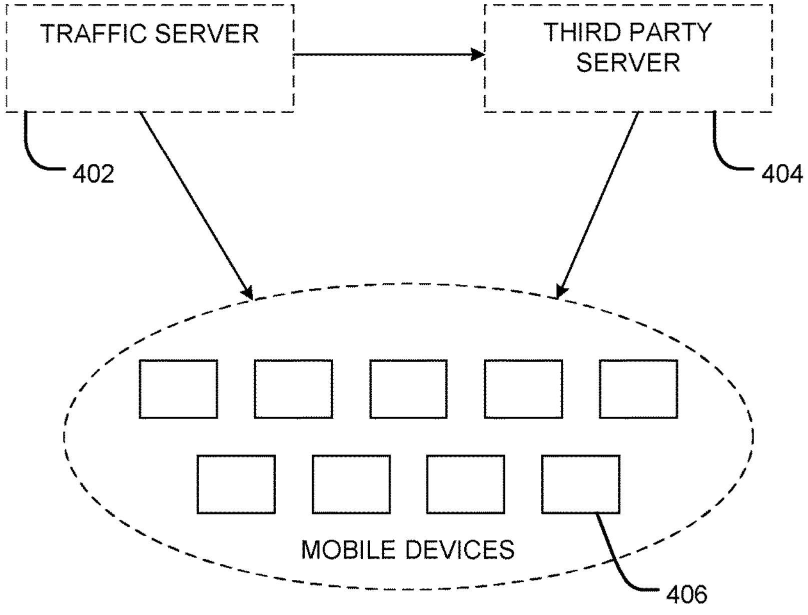
FIG. 5 is a schematic diagram illustrating a system which may be used to implement methods in accordance with the invention.

FIG. 5 illustrates an exemplary system which may be used to perform methods in accordance with the invention in one embodiment. The system 400 includes a traffic server 402, a third party server 404 and a plurality of PNDs 406.

Figure 6:
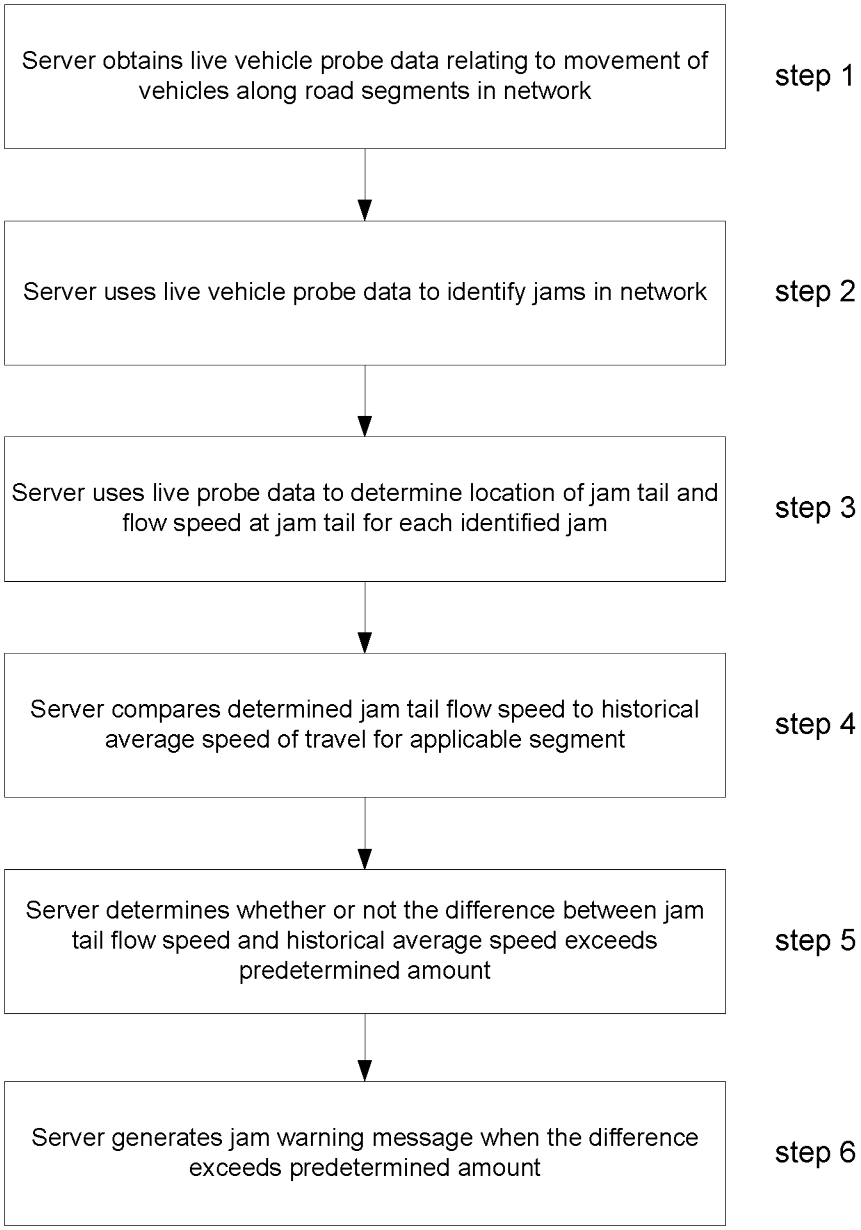
FIG. 6 is a flow chart illustrating one embodiment of a method in accordance with the invention.

By reference to FIG. 6, the traffic server 402 obtains live probe data relating to the movement of devices having positioning capability, e.g. personal navigation devices (PNDs), associated with vehicles travelling along road segments in a road network—step 1. The probe data is time stamped position data representing the movement of the devices, i.e. vehicles, along the segments with respect to time, and is in the form of a plurality of probe traces representing the movement of each device along road segments of the network. The vehicle probe data may be received directly from devices associated with vehicles or from another source e.g. another server.

The server uses the live vehicle probe data to identify jams within the network—step 2. This may be done in any suitable manner. One technique may involve comparing the speed of travel of vehicles along road segments according to the probe data to jam speeds associated with the respective segments, each jam speed being a threshold speed below which it may be assumed that the segment to which it relates is jammed.

When a jam is identified, the server uses the live probe data to determine the location of a tail front of the jam, i.e.an upstream end in the direction of travel for the affected segment, and a flow speed at the jam tail—step 3. The jam tail flow speed is the current driving speed at the jam tail. This speed may be zero. The jam tail flow speed may be determined using live vehicle probe data relating to the movement of vehicles in a region of the jam that is defined as its "tail" portion. This may be, for example, the final 150 m of the jam. The jam tail flow speed may be an average speed obtained using the live data based upon the speeds of multiple vehicles in this region. In other arrangements, the tail portion might be defined as a portion of the jam having a length that corresponds to a given proportion of the jam's overall length. In yet other arrangements, the tail portion may be dynamically defined using the live probe data, e.g. a region where vehicle speeds are below a given threshold speed set by consideration of vehicle speeds in the jam as a whole, or using any other desired technique.

The server may also determine a speed of progression of the jam tail front. This may be determined as a speed at which a jam tail front is moving relative in the driving direction. This may be a positive or negative value, depending upon whether the jam tail is moving downstream or upstream in relation to the driving direction. A quality factor indicative of the reliability of the jam data may also be determined, e.g. based upon a quantity or quality of the live probe data upon which the determination of the jam is based.

The properties of a jam, e.g. jam tail flow speed, jam movement speed, location of jam, etc may be determined using the live probe data in any suitable manner. Live probe data relating to the movement of vehicles along an affected road segment with respect to time and position along the segment may allow a detailed picture of the jam to be built up.

Figure 7:
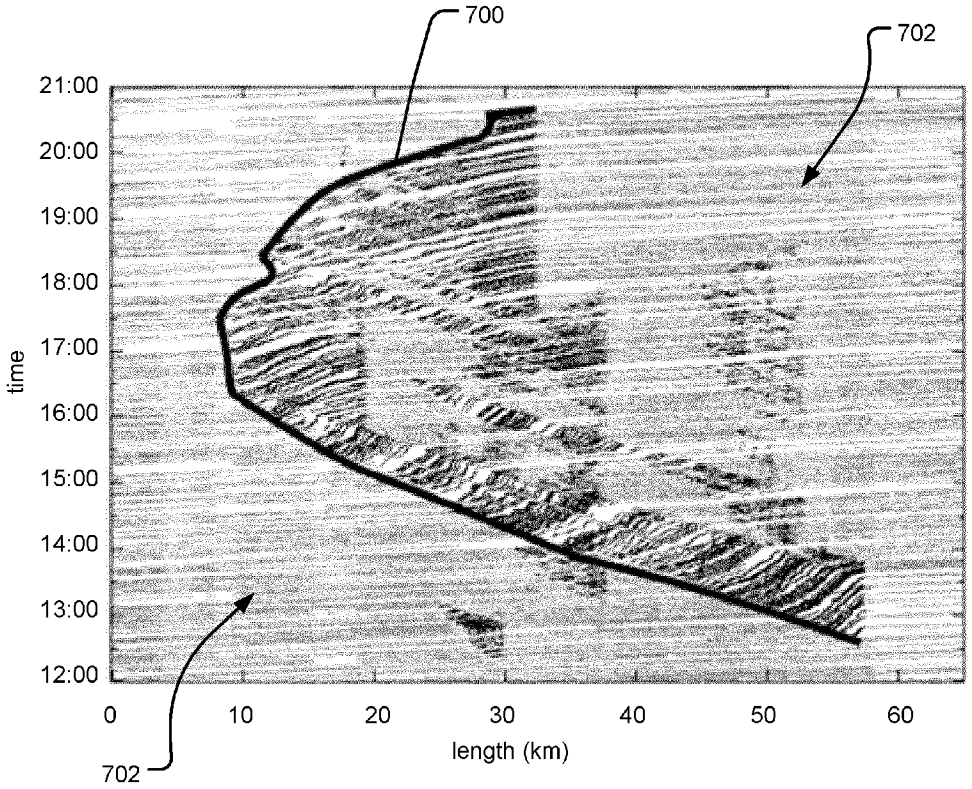
FIG. 7 is an visualisation of data which may be used to identify a jam and properties thereof.

FIG. 7 illustrates a visualisation of a jam obtained using GPS data from the A5 autobahn in Germany. The x and y axes represent length (km) and time, respectively, and the shading represents the speed of movement of vehicles (ranging from 0 to 140 km/h); the darker the shading, the slower the flow speed of the vehicles along the portion of the road network. The figure is thus commonly referred to as a time-space-speed plot, and is constructed from a series of lines, each line representing the variance in speed of movement along a portion of the road network over time. The lighter areas denoted as 702 are therefore indicative of free flow, i.e. with no traffic congestion, with the darker areas indicting a reduction in flow speed, i.e. where there is traffic congestion. A jam tail front can be easily seen in the plot, and is denoted by the line 700.

Returning to FIG. 6, the server compares the determined jam tail flow speed to a historical average speed of travel for the affected segment—step 4. The historical average speed of travel may be based upon historical vehicle probe data, or any other relevant data. The historical average speed of travel may be in respect of a given time period and/or other condition, in which case the applicable historical average speed of travel for the current time is used. The historical average speed of travel may be associated with digital map data indicative of the affected segment. The server determines whether or not the difference between the jam tail flow speed and the historical average speed of travel for the affected segment exceeds a predetermined amount—step 5.

When the difference exceeds the predetermined amount, the server generates a jam warning message—step 6. It can be assumed that the current speeds of vehicles travelling along the affected road segment will correspond at least approximately to the applicable historical average speed of travel for the segment. If the historical average speed of travel for the segment significantly exceeds the jam tail flow speed, there is a likelihood that vehicles will arrive at the jam tail travelling at too great a speed, such that the risk of rear end collision will be greater. By generating a jam warning in this situation, the jam warning may be communicated to navigation devices or ADAS systems associated with vehicles to alert them to an upcoming jam, to enable action to be taken to reduce the speed of vehicles. However, as the determination is based upon historical average speeds of travel along the segment, it does not require knowledge of actual speeds of individual vehicles travelling along the segment.

The generated jam warnings are issued by the server 402, and may be provided along with other data relating to the jam that is provided as part of a regular traffic feed broadcast by the server, i.e. a bulk traffic feed. For example, a server may typically output data indicative of the location of jams in the road network, and may also provide data relating to the speed of movement of the jam, and optionally the historical average speed data for the segment that will be indicative of the speed of travel upstream of the jam. The jam warning may be incorporated with such data where the difference between the jam tail flow speed and the historical average speed of travel for the segment exceeds the predetermined amount. The server may output jam data including the jam warning periodically, e.g. every minute or two.

The step of the server issuing the jam warning may involve the server transmitting the warning to the plurality of mobile devices, e.g. navigation devices 406 (of FIG. 5), or alternatively or additionally to integrated devices and/or ADAS systems associated with vehicles. The jam warning may be provided as part of the regular traffic feed to such devices. The server may issue the jam warning and other jam data only to navigation devices or ADAS systems associated with vehicles that are within a predetermined area based on the jam location. Once received, a navigation device may use the jam warning and other jam related data to issue an alert to a driver to prompt them to reduce speed, e.g. using a visual and/or audible alert. The navigation device may provide such an alert only if it is determined that the actual driver is travelling at too high a speed e.g. close to the average speed for that segment. The alert may be triggered when the vehicle reaches a predetermined location ahead of the jam tail. An ADAS system may adjust target speed to try to ensure the speed of travel of the vehicle matches the jam tail flow speed by the time the vehicle reaches the jam tail.

In other embodiments, the server may transmit the jam warning message and any other jam data to another server, e.g. the third party server 404 (of FIG. 5). The other server may then select whether or not to transmit the jam data onward to navigation devices and/or ADAS systems associated with vehicles that are in communication with the server. For example, the another server may be associated with an automobile company that provides its own navigation system.

While the invention is particularly applicable to embodiments in which a server generates and disseminates jam warning messages, in other embodiments a navigation device may generate such messages using jam tail speed data obtained in any suitable manner.

Figure 8:
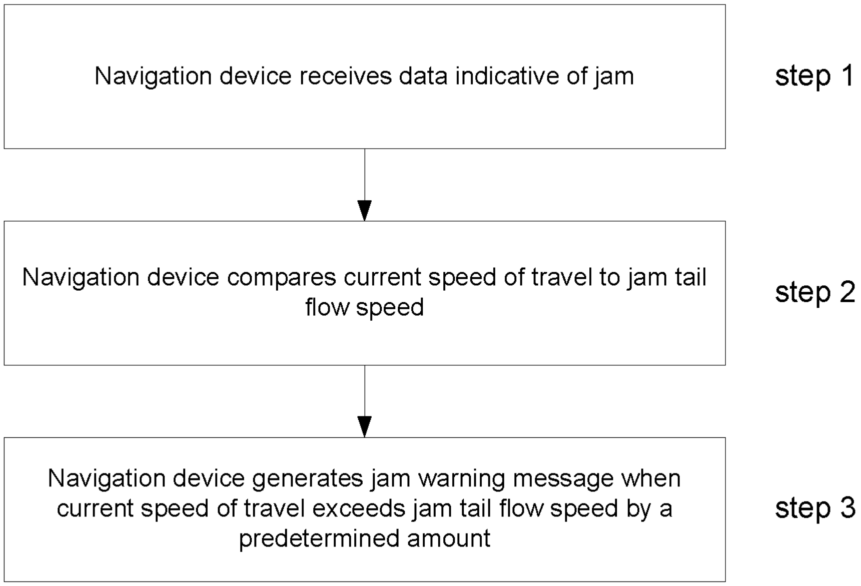
FIG. 8 is a flow chart illustrating another embodiment of a method in accordance with the invention.

A further embodiment of the invention will be described by reference to FIG. 8.

A navigation device associated with a vehicle, whether a PND or an integrated device, receives data indicative of a jam affecting an upcoming road segment—step 1. The jam data may be received from a traffic server. The jam data includes jam tail flow speed data. The jam tail flow speed data may have been obtained by the, or another server, using live vehicle probe data in any of the manners described above. The jam data may be obtained as part of a live traffic feed, together with data relating to any other jams in a given area based on the navigation device's current position. Additional data relating to the jam may also be received, e.g. progression of the jam, location of the jam tail front, etc.

As the vehicle with which the navigation device is associated approaches the jam, the navigation device compares a current speed of travel to the jam tail flow speed—step 2. When the current speed of travel exceeds the jam tail flow speed by a predetermined amount, the navigation device generates a jam warning message—step 3. The comparison of the current speed to jam tail flow speed may be carried out in any of the manners described above in relation to those embodiments in which similar steps are carried out by a server. As described in the earlier embodiment, the navigation device may then output the warning to a driver, or provide it to an ADAS system to allow the driver or ADAS system to take appropriate action to modify the vehicle's speed to more closely match the jam tail flow speed by the time the jam is encountered.

In accordance with any of the embodiments described, a jam warning message is generated taking into account flow speed specifically of the tail of the jam. It has been found that this may result in the generation of messages in a more reliable manner, and where they are most needed to reduce the risk of rear end collisions. This is because the flow speed at a rear end of a jam may differ from that of the jam as a whole.

It should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of providing jam warning messages in relation to jams affecting navigable segments of a network of navigable segments, the method comprising:

obtaining a jam tail flow speed for an identified jam;

comparing the obtained jam tail flow speed to a current speed of travel of a vehicle or a historical speed of travel along an applicable navigable segment; and generating a jam warning message using the results of the comparison when a current or historical speed of travel along the applicable navigable segment exceeds the jam tail flow speed by more than a predetermined amount.

2. The method of claim 1, wherein the jam tail flow speed is a flow speed of vehicles in respect only of a tail end portion of the jam, said tail end portion of the jam being defined as one of: a predetermined distance along the jam from a tail end jam front; and a predetermined proportion of a length of the jam from a tail end jam front.

3. The method of claim 1, wherein the jam tail flow speed is a flow speed of vehicles in respect only of a tail end portion of the jam, said tail end portion of the jam being determined based on a consideration of speeds of travel of vehicles in the jam.

4. The method of claim 1, wherein the method is performed by a computing device, such as a navigation device, associated with a vehicle, and the obtained jam tail flow speed is compared to a current speed of travel of the vehicle.

5. The method of claim 4, wherein the obtaining the jam tail flow speed for the jam comprises receiving data indicative of the jam tail flow speed from a remote server.

6. The method of claim 4, wherein the generated jam warning message is used by the computing device to output a warning to prompt the driver to reduce their speed.

7. The method of claim 4, wherein the generated jam warning message is used by an automatic vehicle control system associated with the vehicle to trigger an intervention to reduce the speed of the vehicle.

8. The method of claim 1, wherein the method is performed by a server, and the obtained flow tail speed is compared to a historic speed of travel along the applicable navigable segment.

9. The method of claim 8, further comprising the server issuing the jam warning message to at least one of: another server; and a plurality of devices associated with vehicles.

10. The method of claim 9, wherein the server is arranged to periodically transmit or broadcast the generated jam warning message.

11. The method of claim 9, wherein the server issues the jam warning message together with data indicative of one or more of: the jam location, the jam tail front location; a speed of progression of the jam tail front, a difference between the jam tail flow speed and a historical speed of travel for an applicable segment, and the jam tail flow speed.

12. The method of claim 1, comprising determining the data indicative of the jam tail flow speed for the jam using positional data relating to the movement of a plurality of devices associated with vehicles along the affected segment with respect to time.

13. The method of claim 12, further comprising, for the identified jam, using the positional data to determine one or more of: a location of the jam tail; and data indicative of the progression of the jam tail front.

14. A system for providing jam warning messages in relation to jams affecting navigable segments of a network of navigable segments, the system comprising:

a transmitter and a receiver;

a memory;

one or more processors, wherein the one or more processor are operable to:

obtain a jam tail flow speed for an identified jam;

compare the obtained jam tail flow speed to a current speed of travel of a vehicle or a historical speed of travel along an applicable navigable segment; and generate a jam warning message using the results of the comparison when a current or historical speed of travel along the applicable navigable segment exceeds the jam tail flow speed by more than a predetermined amount.

15. The system of claim 14, wherein the system is a computing device, such as a navigation device, associated with a vehicle, and the computing device is arranged to compare the obtained jam tail flow speed to a current speed of travel of the vehicle.

16. The system of claim 14, wherein the system is a server, and the server is arranged to compare the obtained flow tail speed to a historic speed of travel along the applicable navigable segment.

17. A non-transitory computer readable medium which stores a set of instructions which when executed performs a method for providing jam warning messages in relation to jams affecting navigable segments of a network of navigable segments, the method executed by the set of instructions comprising obtaining a jam tail flow speed for an identified jam;

comparing the obtained jam tail flow speed to a current speed of travel of a vehicle or a historical speed of travel along an applicable navigable segment; and generating a jam warning message using the results of the comparison when a current or historical speed of travel along the applicable navigable segment exceeds the jam tail flow speed by more than a predetermined amount.

* * * * *